K. O. MUEHLBERG.
PIPE COUPLING.
APPLICATION FILED JULY 10, 1914.

1,211,741. Patented Jan. 9, 1917.

WITNESSES

INVENTOR

UNITED STATES PATENT OFFICE.

KARL O. MUEHLBERG, OF MANITOWOC, WISCONSIN.

PIPE-COUPLING.

1,211,741. Specification of Letters Patent. Patented Jan. 9, 1917.

Application filed July 10, 1914. Serial No. 850,180.

*To all whom it may concern:*

Be it known that I, KARL O. MUEHLBERG, a resident of Manitowoc, in the county of Manitowoc and State of Wisconsin, have invented a new and useful Improvement in Pipe-Couplings, of which the following is a specification.

This invention relates to hose and pipe couplings.

The object of the invention is to provide a simple coupling for connecting pipes or conduits, such as flexible hose lines, and which coupling is simple, can be readily manufactured, is easily connected and disconnected, which produces a tight joint, which is not liable to be accidentally disconnected, such as by dragging the hose line over obstacles; and which has a smooth exterior free of projections, operating mechanism or the like.

The invention comprises the construction and arrangement of parts hereinafter described and claimed.

Figure 1:
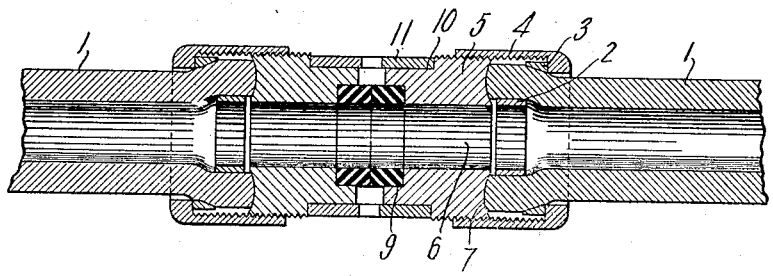
Figure 2:
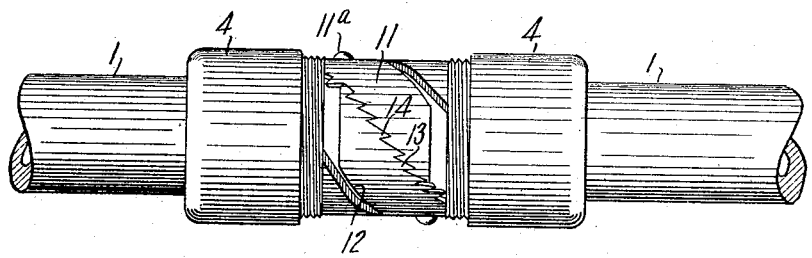
Figure 3:
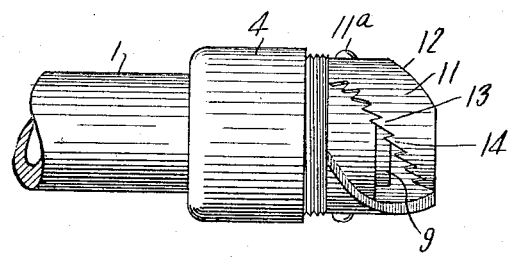
Figure 4:
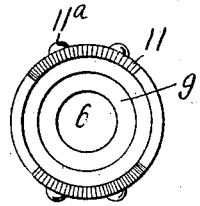

In the drawings, Figure 1 represents a longitudinal sectional view through a coupling embodying the invention; Fig. 2 is an elevation thereof; Fig. 3 is an elevation of one of the pair of coupling members; and Fig. 4 is an end view of the same from the right in Fig. 3.

The coupling shown is arranged to connect the ends of two pipes or conduits 1, which may be of any suitable type, but are shown as ordinary rubber hose. The end of the hose is cut off square and is provided with an inner ring or thimble 2 of a diameter slightly larger than the internal diameter of said hose, and with an outer ring or collar 3, which is pushed up toward the end of the hose until it jams over the inner ring or thimble 2 and which forms a shoulder for coöperation with the inner shoulder of a nut 4, which is formthreaded onto the exterior of a body member 5. Said body member is provided with a bore or channel 6 and one end portion thereof is provided with an annular concavity, depression or seat 7 against which the end of the hose 1 abuts. By tightening up the nut 4 the end of the hose is forced tightly against the seat and produces a liquid tight joint. This construction does away with the necessity of a special washer or gasket and forms a strong serviceable connection between the hose and coupling device.

The body 5 of the coupling device may be made of any suitable material but preferably is of brass, bronze, or some other non-rusting metal. Its outer end is provided with an annular seat to receive a suitable packing ring or gasket 9 of rubber, leather or the like, which extends beyond the end of the body as shown in Fig. 1. The end of the body is also reduced externally to provide a seat 10 to receive a plurality of coupling prongs or members 11, which members are suitably disposed at regular intervals around the circumference of the body and are secured thereto in any suitable manner, as by screws or bolts 11$^a$, so that they may be readily replaced when worn. Said members are preferably made of a good wearing material, such as steel, so as to prolong the life of the coupling.

The coupling members 11 are in the form of spiral projections extending beyond the end of the coupling device and having two spiral edge portions, a front edge 12 and a rear edge 13, of which the latter is provided with a plurality of serrations or teeth 14; the front edge portion 12 being smooth and continuous. Each of the coupling devices may be provided with any suitable number of coupling teeth or members 11, two being shown in the drawings. These members are of a width somewhat less than the width of the spaces between said members, in order to enable the two devices to be coupled and uncoupled as hereinafter more fully described.

The device is used as follows: The ends of two sections of hose to be coupled are provided with similar coupling devices as shown in Fig. 3. The two hose sections are connected by moving them endwise toward each other and entering the coupling teeth or members 11 of one device into the spaces between the coupling teeth of the other device, the two coupling devices being simultaneously rotated in the proper direction so that the teeth of the coupling members pass each other. The two devices are pushed together until the gaskets or packings 9 are compressed and are then rotated, whereupon the teeth in one member are interlocked with those on the other by the tendency of the gaskets to expand when the endwise pressure upon them ceases, thereby locking the coupling device together. The coupling members 11 are made of some length in order to provide some range of adjustment to enable the couplings to be connected in different positions by forcing them together to a greater or less amount. Moreover, when the gasket or packing 9 becomes worn the two couplings can be moved up another notch and reëngaged to tighten the joint. The couplings are disengaged by forcing them together and rotating them slightly in the backward direction to disengage the locking teeth, and then drawing them apart.

The coupling described is simple and is readily manipulated. It has the advantage that there are no lateral projections on the device, but its side surfaces are smooth and therefore are not liable to catch in obstructions over which the hose may be dragged. Moreover, there is no operating mechanism which is liable to be accidentally operated and release the coupling.

What I claim is:—

1. A hose or pipe coupling, comprising a body member provided at one end with means for connecting it to a conduit and at the other end having a plurality of circumferentially spaced projections provided with spirally arranged front and rear edges, the spaces between said projections being slightly wider than said projections, said rear edges being provided with teeth and the front edges being uninterrupted, whereby the front edges of like mating coupling members guide said projections to interlocking position of said teeth, and a gasket seated in said body member and projecting endwise therefrom for coöperation with a similar gasket of the mating member.

2. A hose or pipe coupling, comprising a body member provided at one end with means for connecting it to a conduit and at the other end having a plurality of circumferentially spaced projections detachably connected thereto and provided with spirally arranged front and rear edges, the spaces between said projections being slightly wider than said projections, said rear edges being provided with teeth and the front edges being uninterrupted, whereby the front edges of like mating coupling members guide said projections to interlocking position of said teeth, and a gasket seated in said body member and projecting endwise therefrom for coöperation with a similar gasket of the mating member.

In testimony whereof, I have hereunto set my hand.

KARL O. MUEHLBERG.

Witnesses:
J. PETER EASTMAN,
I. CRAITE.

Copies of this patent may be obtained for five cents each, by addressing the "Commissioner of Patents, Washington, D. C."